April 25, 1967     H. A. ELLIOTT     3,315,591
BARBECUE DEVICE
Filed March 30, 1964
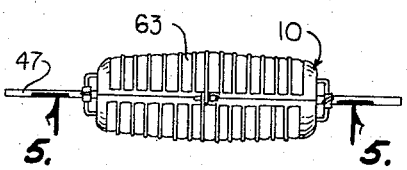
Fig. 1
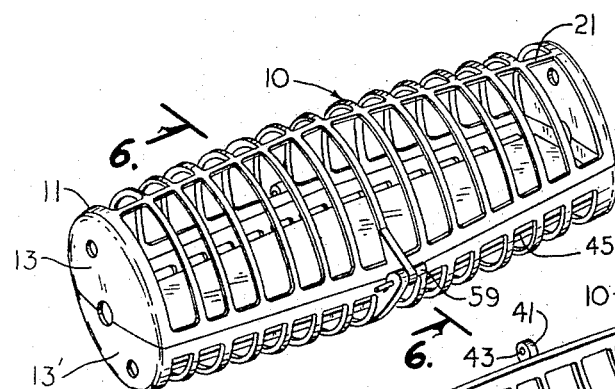
Fig. 2
Fig. 3
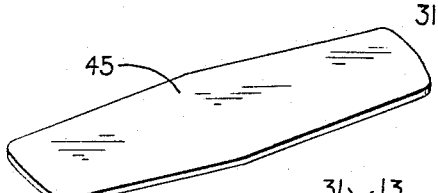
Fig. 4
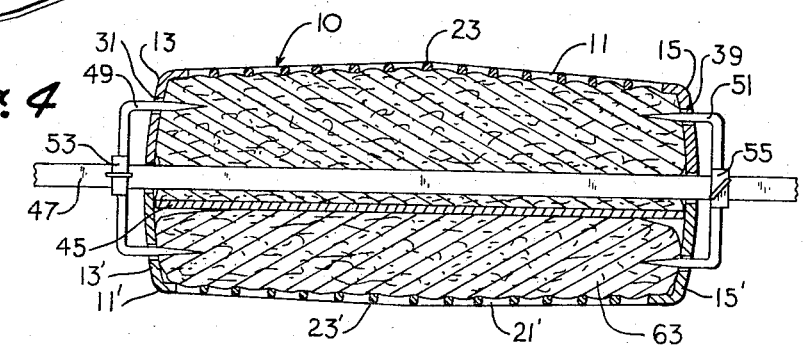
Fig. 5
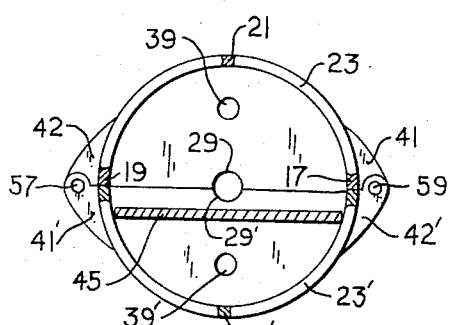
Fig. 6
INVENTOR
HERBERT A. ELLIOTT
BY Dick & Zarley
ATTORNEYS

United States Patent Office 3,315,591
Patented Apr. 25, 1967

3,315,591
BARBECUE DEVICE
Herbert A. Elliott, 604 Middle St.,
Webster City, Iowa 50595
Filed Mar. 30, 1964, Ser. No. 355,624
7 Claims. (Cl. 99—421)

This invention relates to a barbecue device and more particularly to a barbecue basket which is mounted on a rotatable spit means.

The barbecue baskets are filled with the food that is to be cooked or barbecued and the basket is mounted on a turning spit which is spaced above ignited coals. The baskets are used to obtain an even cooking of the food within the basket without burning it. The food inside the basket necessarily tumbles as the basket rotates. This tumbling causes the food to crumble into pieces and sometimes fall from the basket. Additionally, the baskets have no means associated therewith to retain the natural juices of the cooking food therein.

Further, the barbecue baskets available on the market today do not have smooth inside surfaces. The rough interior of these barbecue baskets have a tendency to tear the cooking food. Also, the barbecue baskets available on the market today are usually very difficult to clean after usage.

Therefore, a principal object of this invention is to provide a barbecue device which prevents the food contained therein from tumbling during cooking.

A further object of this invention is to provide a barbecue device which insures uniform cooking of the food contained therein.

A further object of this invention is to provide a barbecue device which is easy to clean after usage.

A still further object of this invention is to provide a barbecue basket which retains therein the natural juices of the cooking food.

A still further object of this invention is to provide a barbecue device which permits easy insertion and withdrawal of the food to be cooked.

A still further object of this invention is to provide a barbecue device which is economical of manufacture, durable in use and refined in appearance.

These and other objects will be apparent to those skilled in the art.

This invention consists in the construction, arrangements, and combination of the various parts of the device, whereby the objects contemplated are attained as hereinafter more fully set forth, specifically pointed out in the claims, and illustrated in the accompanying drawings, in which:

FIG. 1 is a front elevational view of the device mounted on a spit means;

FIG. 2 is a perspective of the device in a closed position;

FIG. 3 is a perspective view of the device in an open position;

FIG. 4 is a perspective view of an elongated, flat plate;

FIG. 5 is a sectional view of the device as seen on line 5—5 of FIG. 1, at an enlarged scale; and FIG. 6 is a sectional view of the device as seen on line 6—6 of FIG. 2, at an enlarged scale.

The numeral 10 generally indicates an elongated, substantially cylindrical basket comprised of identical first and second basket portions 11 and 11', hingedly secured together as illustrated in FIG. 3. Inasmuch as basket proportions 11 and 11' are identical, only basket portion 11 will be described with the identical features of 11' being indicated by (').

Basket portion 11 is comprised of spaced apart end members 13 and 15 having bar members 17, 19 and 21 extending therebetween. A plurality of rib members 23 are secured to bar members 17, 19 and 21 and extend transversely thereto. It should be noted that bars 17, 19 and 21 are rectangular in cross-section and rib members 23 are substantially square in cross-section.

End member 13 is semicircular and has an arcuate edge 25 and a straight edge 27. Straight edge 27 has a semicircular cutaway area 29 therein substantially at the center of its length. A hole 31 is also provided in end member 13 between cutaway area 29 and the junction of bar member 21 and end member 13.

End member 15 is semicircular in shape and has an arcuate edge 33 and a straight edge 35. Straight edge 35 has a semicircular cutaway area 37 therein substantially at the center of its length. A hole 39 is also provided in end member 15 between cutaway area 37 and the junction of bar member 21 and end member 15.

Bar member 17 has secured thereto a hinge member 41 having hole 43 therein. Bar member 19 has secured thereto a hinge member 42 having a hole 44. Basket portions 11 and 11' are hingedly secured together by means of pin 57 extending through hinge members 41' and 42.

The numeral 45 represents a flat plate member adapted to be received within basket portions 11 or 11' as illustrated in FIGS. 2, 3, 5 and 6. The numeral 47 represents an elongated rotatable spit means having U-shaped fork members 49 and 51 mounted thereon and secured thereto by detent members 53 and 55 respectively.

Basket portions 11 and 11' may be locked in a closed position as illustrated in FIG. 2 by means of pin 59 extending through hinge members 41 and 42'. Pin 59 has a spring means 61 therein to retain it within holes 43 and 44'. The numeral 63 generally represents a quantity of food.

It should be noted that when basket 10 is in a closed position, as illustrated in FIG. 2, semicircular cutaway areas 29 and 29' register to form a circular hole adapted to receive spit 47 while semicircular cutaway areas 37 and 37' also register to form a circular hole adapted to receive spit 47. It should also be noted that basket portions 11 and 11' are each of one piece cast construction. The interiors of basket portions 11 and 11' present a smooth, even surface.

It should also be noted that the longitudinal edges of plate 45 engage rib members 23' adjacent their outer ends to limit the inward movement of plate 45 with respect to basket portion 11' as illustrated in FIG. 3.

The normal operation is as follows:

Food 63 is placed in basket portion 11. Plate 45 is then placed on top of the food 63. Food 63 may also be placed in basket portions 11' if so desired and the device closed by means of pin 57 extending through holes 43 and 44' in hinge members 41 and 42'. Spit 47 is then extended into basket 10 through the holes formed by semicircular cutaway areas 29, 29' and 37, and 37'. Fork member 49 is then extended into basket 10 through holes 31 and 31' in end members 13 and 13' and locked into position by detent 53. Fork member 51 is then extended into basket 10 through holes 39 and 39' in end members 15 and 15' and locked into position by detent 55.

Spit 47 will then be placed over a suitable fire and caused to rotate by any convenient means. Plate 45 being maintained in a semistationary position within basket 10 by fork members 49 and 51 and by spit 47, as illustrated in FIG. 5, prevents the contained food 63 from unnecessary tumbling during the rotational cooking.

The inside of basket 10 presents a smooth, continuous surface due to its one piece cast construction. This feature prevents unnecessary tearing of the cooking food. The smooth continuous surface of the interior of basket 10 also aids in retaining the natural juices therein which have been discharged by the cooking food. The juices tend to flow along the inside of rib members 23 as basket 10 rotates and to drip back upon the cooking food as the basket rotates. This feature is highly desirable in that the food will not dry out. If rough, uneven surfaces were present within the basket, the juices would not flow evenly and would have the tendency to fall into the fire upon encountering an obstruction. It is obvious that the smooth, continuous inside surface of basket 10, due to its one piece construction, facilitates easy cleaning of the device. It is also obvious that the means for hingedly securing basket portion 11 and 11' together facilitate easy insertion and withdrawal of the food to be cooked.

Thus, from the foregoing it can be seen that the invention accomplishes at least all of its stated objectives.

Some changes may be made in the construction and arrangement of my barbecue device without departing from the real spirit and purpose of my invention, and it is my intention to cover by my claims, any modified forms of structure or use of mechanical equivalents which may be reasonably included within their scope.

I claim:
1. In a barbecue device,
an elongated, substantially cylindrical basket comprised of first and second basket portions hingedly secured together intermediate their length,
said first and second basket portions each comprised of spaced apart end members having a plurality of bar members extending therebetween,
a plurality of rib members secured to said plurality of bar members extending transversely thereto,
each of said end members being semi-circular in shape and having an arcuate edge portion and a straight edge portion,
each of said straight edge portions having a semi-circular cutaway area therein substantially in the center of their length,
and a hole in each of said end members between said cutaway area and the center of the length of said arcuate edge portion.

2. In a barbecue device,
an elongated, substantially cylindrical basket comprised of first and second basket portions hingedly secured together intermediate their length,
said first and second basket portions each comprised of spaced apart end members having a plurality of bar members extending therebetween,
a plurality of rib members secured to said plurailty of bar members extending transversely thereto,
each of said end members being semi-circular in shape and having an arcuate edge portion and a straight edge portion,
each of said straight edge portions having a semi-circular cutaway area therein substantially in the center of their length,
and a hole in each of said end members between said cutaway area and the center of the length of said arcuate edge portion,
said first and second basket portions each being of one-piece, cast construction.

3. The device of claim 2 wherein said rib members are substantially square in cross-section.

4. The device of claim 2 wherein said rib members are substantially square in cross-section and said bar members are substantially rectangular in cross-section.

5. The device of claim 2 wherein the interior of each of said basket portions have a uniform, smooth surface.

6. The device of claim 2 wherein an elongated, flat plate is received by one of said first or second basket portions.

7. In combination with a rotatable spit having spaced apart first and second U-shaped fork members movably mounted thereon, an elongated substantially cylindrical basket mounted on said spit,
said basket comprised of spaced apart end members having a plurality of bar members extending therebetween,
each of said end members having a first hole therein substantially in the center thereof,
each of said end members having second and third holes therein on either side of said first hole, said first, second and third holes being aligned,
said spit extending through said first holes in each of said end members, said first and second fork members extending through said second and third holes of said first and second end members respectively,
an elongated flat plate in said basket disposed between said spit and said fork members,
and means for opening and closing said basket at times.

References Cited by the Examiner

UNITED STATES PATENTS

| | | | |
|---|---|---|---|
| 255,380 | 3/1882 | Dodson | 99—450 |
| 504,256 | 9/1893 | Strong | 99—427 X |
| 553,363 | 1/1896 | Sickels | 99—427 |
| 1,480,897 | 1/1924 | DeMotte | 220—22 |
| 2,839,989 | 6/1958 | Persinger | 99—427 X |
| 2,882,812 | 4/1959 | Greenwald | 99—427 |
| 2,938,450 | 5/1960 | Carpenter et al. | 99—427 |

WALTER A. SCHEEL, *Primary Examiner.*

S. P. FISHER, *Assistant Examiner.*